(12) United States Patent
Jerdee et al.

(10) Patent No.: US 6,333,087 B1
(45) Date of Patent: Dec. 25, 2001

(54) OXYGEN SCAVENGING PACKAGING

(75) Inventors: Gary D. Jerdee, Orange, TX (US); James P. Leonard, San Rafael, CA (US); Ta Yen Ching, Novato, CA (US); Joseph L. Goodrich, Lafayette, CA (US); Brad D. Rodgers, Orange, TX (US); Richard P. Schmidt, Plainfield, IL (US)

(73) Assignee: Chevron Chemical Company LLC, San Francisco, CA (US)

( * ) Notice: Subject to any disclaimer, the term of this patent is extended or adjusted under 35 U.S.C. 154(b) by 0 days.

(21) Appl. No.: 09/141,168

(22) Filed: Aug. 27, 1998

(51) Int. Cl.$^7$ ............... B29D 22/00; B65D 5/00; B32B 27/00; C09K 15/04
(52) U.S. Cl. ............. 428/35.9; 428/35.7; 428/36.7; 428/479.6; 252/188.28; 229/100
(58) Field of Search .............. 252/188.28; 428/66.4, 428/35.7, 34.2, 35.6, 35.8, 35.9, 36.6, 36.7, 479.6; 206/245; 229/87.01, 100

(56) References Cited

U.S. PATENT DOCUMENTS

| | | |
|---|---|---|
| 3,497,571 | 2/1970 | Tellier et al. ............ 260/844 |
| 3,536,687 | 10/1970 | Nordstrom . |
| 4,415,710 | 11/1983 | Barnabeo et al. ............ 525/370 |
| 4,524,201 | 6/1985 | Barnabeo et al. ............ 528/395 |
| 4,807,745 * | 2/1989 | Langley et al. ............ 206/245 |
| 5,021,515 | 6/1991 | Cochran et al. . |
| 5,034,252 | 7/1991 | Nilsson et al. . |
| 5,049,624 | 9/1991 | Adams et al. . |
| 5,116,916 | 5/1992 | Young ............ 525/350 |
| 5,211,875 | 5/1993 | Speer et al. . |
| 5,346,644 | 9/1994 | Speer et al. . |
| 5,350,622 | 9/1994 | Speer et al. . |
| 5,425,896 | 6/1995 | Speer et al. ............ 252/188.28 |
| 5,466,756 | 11/1995 | Roach et al. ............ 525/330.6 |
| 5,498,364 | 3/1996 | Speer et al. ............ 252/188.28 |
| 5,529,833 | 6/1996 | Speer et al. . |
| 5,627,239 | 5/1997 | Ching et al. . |
| 5,639,815 | 6/1997 | Cochran et al. . |
| 5,641,825 | 6/1997 | Bacskai et al. . |
| 5,656,692 | 8/1997 | Hayes ............ 525/63 |
| 5,660,761 | 8/1997 | Katsumoto et al. . |
| 5,700,554 | 12/1997 | Speer et al. . |
| 5,736,616 * | 4/1998 | Ching et al. ............ 525/330.3 |
| 5,776,361 | 7/1998 | Katsumoto et al. . |
| 5,837,158 | 11/1998 | Shepodd et al. ............ 252/181.6 |
| 5,859,145 | 1/1999 | Ching et al. . |
| 5,942,297 * | 8/1999 | Speer et al. ............ 428/35.4 |
| 6,057,013 * | 5/2000 | Ching et al. ............ 428/35.7 |
| 6,063,307 * | 5/2000 | Shepodd et al. ............ 252/181.6 |

FOREIGN PATENT DOCUMENTS

| | | |
|---|---|---|
| 0507207 | 10/1992 | (EP) . |
| 0794053 | 9/1997 | (EP) . |
| 2036012 | 6/1980 | (GB) . |
| WO 9407379 | 4/1994 | (WO) . |
| WO 9407944 | 4/1994 | (WO) . |
| WO 9640799 | 12/1996 | (WO) . |
| WO 9806779 | 2/1998 | (WO) . |

* cited by examiner

Primary Examiner—Joseph D. Anthony
(74) Attorney, Agent, or Firm—Williams, Morgan & Amerson, P.C.

(57) ABSTRACT

Oxygen scavenging materials incorporated into or attached to a package such as a gable-top or rectangular carton, used to package foods, beverages or other oxygen sensitive materials, and thereby increase shelf-life by decreasing oxygen in the headspace of the package, and decreasing oxidation of the packaged product.

27 Claims, 4 Drawing Sheets

OXYGEN SCAVENGING PACKAGING

FIELD OF THE INVENTION

The present invention relates to oxygen scavenging for use in packaging, such as in gable-top or rectangular cartons used to package food products, beverages, oxygen-sensitive materials and components.

BACKGROUND OF THE INVENTION

It is well known that regulating the exposure of oxygen-sensitive products to oxygen maintains and enhances the quality and "shelf-life" of the product. For instance, by limiting the exposure of oxygen sensitive food products to oxygen in a packaging system, the quality or freshness of food is maintained, spoilage reduced, and the food shelf life extended. In the food packaging industry, several means for regulating oxygen exposure have already been developed. These means include modified atmosphere packaging (MAP) and oxygen barrier film packaging.

For packaging material used in gable top or rectangular cartons, a coated paper or cardboard stock is often used. The coating for the paper or cardboard stock is usually a polymer-based resin, such as polyethylene, which can be applied to the paper or paperboard stock by extrusion coating or laminating. Such a coating serves not only to make the packaging material waterproof, but can also serve as an oxygen barrier.

In one known example of such an extrusion coated paper packaging material, the extrusion coating composition is comprised of greater than 20 and less than 98 weight percent of a high pressure low density polyethylene homopolymer and/or copolymer and greater than 2 and less than 80 weight percent of at least one linear low density ethylene hydrocarbon copolymer.

In an example of such a resin coated packaging material specifically designed to have enhanced oxygen barrier qualities, an additional layer of polyamide is added to the low density polyethylene laminated paperboard. In a similar example, an additional layer of heat-sealable ethylene vinyl alcohol copolymer is added to the low density polyethylene laminated paperboard.

One method currently being used for regulating oxygen exposure is "active packaging", whereby the package containing the food product has been modified in some manner to regulate the food's exposure to oxygen. One form of active packaging uses oxygen-scavenging sachets which contain a composition which scavenges the oxygen through oxidation reactions. One type of sachet contains iron-based compositions which oxidize to their ferric states. Another type of sachet contains unsaturated fatty acid salts on a particulate adsorbent. Yet another sachet contains metal/polyamide complex. However, one disadvantage of sachets is the need for additional packaging operations to add the sachet to each package. A further disadvantage arising from the iron-based sachets is that certain atmospheric conditions (e.g., high humidity, low $CO_2$ level) in the package are sometimes required in order for scavenging to occur at an adequate rate. Further, the sachets can present a problem to consumers if accidentally ingested.

Another means for regulating exposure of a packaged product to oxygen involves incorporating an oxygen scavenger into the packaging structure itself. A more uniform scavenging effect through the package is achieved by incorporating the scavenging material in the package instead of adding a separate scavenger structure (e.g., a sachet) to the package. This may be especially important where there is restricted airflow inside the package. In addition, incorporating the oxygen scavenger into the package structure provides a means of intercepting and scavenging oxygen as it permeates the walls of the package (herein referred to as an "active oxygen barrier"), thereby maintaining the lowest possible oxygen level in the package. Limited success has been achieved in incorporating oxygen scavenging material into the walls of packages for various types of food.

One attempt to prepare an oxygen-scavenging wall involves the incorporation of inorganic powders and/or salts. However, incorporation of these powders and/or salts causes reduction of the wall's optical transparency, discoloration after oxidation, and reduced mechanical properties such as tear strength. In addition, these compounds can lead to processing difficulties, especially when fabricating thin films. The oxidation products, which can be absorbed by food in the container, typically would not have FDA approval for human consumption.

Some oxygen scavenging systems produce an oxygen-scavenging wall. This is done by incorporating a metal catalyst-polyamide oxygen scavenging system into the package wall. Through catalyzed oxidation of the polyamide, the package wall regulates the amount of oxygen which reaches the interior volume of the package (active oxygen barrier) and has been reported to have oxygen scavenging rate capabilities up to about 5 cubic centimeters (cc) oxygen per square meter per day at ambient conditions. However, this system suffers from significant disadvantages.

One particularly limiting disadvantage of polyamide/catalyst materials can be a low oxygen scavenging rate. Adding these materials to a high-barrier package containing air can produce a package which is not generally suitable for creating the desired internal oxygen level.

There are also disadvantages to having the oxygen-scavenging groups in the backbone or network structure in this type of polyamide polymer. The basic polymer structure can be degraded and weakened upon reaction with oxygen. This can adversely affect physical properties such as tensile or impact strength of the polymer. The degradation of the backbone or network of the polymer can further increase the permeability of the polymer to those materials sought to be excluded, such as oxygen.

Moreover, polyamides previously used in oxygen scavenging materials, such as MXD6, are typically incompatible with thermoplastic polymers used in most plastic packaging walls, such as ethylene-vinyl acetate copolymers and low density polyethylene. Even further, when such polyamides are used by themselves to make a package wall, they may result in inappropriately stiff structures. They also incur processing difficulties and higher costs when compared with the costs of thermoplastic polymers typically used to make flexible packaging. Even further, they are difficult to heat seal. Thus, all of these are factors to consider when selecting materials for packages, especially multi-layer flexible packages and when selecting systems for reducing oxygen exposure of packaged products.

Another approach to scavenging oxygen is an oxygen-scavenging composition comprising an ethylenically unsaturated hydrocarbon and a transition metal catalyst. Ethylenically unsaturated compounds such as squalene, dehydrated castor oil, and 1,2-polybutadiene are useful oxygen scavenging compositions, and ethylenically saturated compounds such as polyethylene and ethylene copolymers are useful as diluents. Compositions utilizing squalene, castor oil, or other such unsaturated hydrocarbon typically have an oily texture as the compound migrates toward the surface of the material. Further, polymer chains which are ethylenically unsaturated in the backbone would be expected to degrade upon scavenging oxygen, weakening the polymer due to polymer backbone breakage, and generating a variety of off-odor, off-taste by-products.

Oxygen scavenging layers extruded or laminated onto the surface of paperboard stock have been tried with limited success. In one of these examples, the oxygen scavenging layer is an ethylenically unsaturated hydrocarbon and a transition metal catalyst. Other known examples of an oxygen scavenging layer that can be coated onto the surface of paper board stock and which furthermore retain oxygen scavenging capabilities at low temperatures are atactic-1,2-polybutadiene, EPDM rubbers, polyoctenamer, and 1,4-polybutadiene.

An oxygen-scavenging composition comprising a blend of a first polymeric component comprising a polyolefin is known, the first polymeric component having been grafted with an unsaturated carboxylic anhydride or an unsaturated carboxylic acid, or combinations thereof, or with an epoxide; a second polymeric component having —OH, —SH, or —NHR$^2$ groups where R$^2$ is H, C$_1$–C$_3$ alkyl, substituted C$_1$–C$_3$ alkyl; and a catalytic amount of metal salt capable of catalyzing the reaction between oxygen and the second polymeric component, the polyolefin being present in an amount sufficient so that the blend is non phase-separated. A blend of polymers is utilized to obtain oxygen scavenging, and the second polymeric component is preferably a polyamide or a copolyamide such as the copolymer of m-xylylene-diamine and adipic acid (MXD6).

Other oxidizable polymers recognized in the art include "highly active" oxidizable polymers such as poly(ethylene-methyl acrylate-benzyl acrylate), EBZA, and poly(ethylene-methyl acrylate-tetrahydrofuryl acrylate), EMTF, as well as poly(ethylene-methyl acrylate-nopol acrylate), EMNP. Blends of suitable polymers are also acceptable, such as a blend of EMTF and poly-d-limonene. Although effective as oxygen scavengers, these polymers have the drawback of giving off a strong odor before oxygen scavenging and large amounts of volatile byproducts before and after oxygen scavenging.

Also known are oxygen-scavenging compositions which comprise a transition-metal salt and a compound having an ethylenic or polyethylenic backbone and having allylic pendent or terminal moieties which contain a carbon atom that can form a free radical that is resonance-stabilized by an adjacent group. Such a polymer needs to contain a sufficient amount and type of transition metal salt to promote oxygen scavenging by the polymer when the polymer is exposed to an oxygen-containing fluid such as air. Although effective as oxygen scavengers, upon oxidation, it has been found that allylic pendent groups on an ethylenic or polyethylenic backbone tend to generate considerable amounts of organic fragments. It is believed that this is a result of oxidative cleavage. These fragments can interfere with the use of allylic pendent groups as oxygen scavengers in food packaging by generating compounds that can affect taste and odor of the packaged products.

The present invention solves many of the problems of the prior art encountered when oxygen scavenging material has been incorporated into packaging materials. In various specific embodiments, the present invention solves many of the particular problems encountered with incorporating oxygen scavenging material into the structure of food packaging material such as paperboard stock for gable-top or rectangular cartons.

SUMMARY OF THE INVENTION

In one embodiment, the present invention relates to a method of using oxygen scavenging material to decrease oxidation and maintain product properties in packaged foods, beverages, oxygen-sensitive materials or oxygen-sensitive components comprising the steps of:

(a) incorporating an oxygen scavenging material into the structure of a container used to package foods, beverages, oxygen-sensitive materials or oxygen-sensitive components;

(b) placing beverages, foods, oxygen sensitive materials or oxygen sensitive components in the container;

(c) sealing the container; and (d) storing the container at a temperature between 20° F. and 120° F.

In another embodiment, the present invention relates to a method of storing foods, beverages, oxygen-sensitive materials or oxygen-sensitive components for an extended period while maintaining product properties comprising the steps of:

(a) incorporating an oxygen scavenging material into the structure of a container used to package foods, beverages, oxygen-sensitive materials or oxygen-sensitive components;

(b) placing beverages, foods, oxygen sensitive materials or oxygen sensitive components in the container;

(c) sealing the container; and (d) storing the container at a temperature between 20° F. and 120° F.

In a preferred embodiment of the above-described invention, the method is performed under aseptic packaging conditions.

In another preferred embodiment of the above-described invention, the method is performed under cold-filled packaging conditions.

In yet another preferred embodiment of the above-described invention, the oxygen scavenging material is selected from the group consisting of oxidizable polymers, ethylenically unsaturated polymers, benzylic polymers, allylic polymers, polybutadiene, poly[ethylene-methyl acrylate-cyclohexene acrylate] terpolymers, poly[ethylene-vinylcyclohexene] copolymers, polylimonene resins, poly β-pinene and poly α-pinene.

In another preferred embodiment of the above-described invention, the oxygen scavenging material of either of the above methods comprises a polymeric backbone, cyclic olefinic pendent groups and linking groups linking the olefinic pendent groups to the polymeric backbone.

In a more preferred embodiment of the above-described invention, the polymeric backbone is ethylenic and the linking groups are selected from the group consisting of:

—O—(CHR)$_n$—; —(C=O)—O—(CHR)$_n$—; —NH—(CHR)$_n$—; —O—(C=O)—(CHR)$_n$—;

—(C=O)—NH—(—CHR)$_n$—; and —(C=O)—O—CHOH—CH$_2$—O—;

wherein R is hydrogen or an alkyl group selected from the group consisting of methyl, ethyl, propyl and butyl groups and where n is an integer in the range from 1 to 12.

In another more preferred embodiment of the above-described invention, the cyclic olefinic pendent groups have the structure (I):

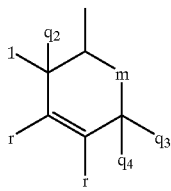

where $q_1$, $q_2$, $q_3$, $q_4$, and r are selected from the group consisting of —H, —CH$_3$, and —C$_2$H$_5$; and where m is —(CH$_2$)$_n$— with n being an integer in the range from 0 to 4; and wherein, when r is —H, at least one of $q_1$, $q_2$, $q_3$ and $q_4$ is —H.

In yet another preferred embodiment of the above-described invention, the polymeric backbone comprises monomers selected from the group consisting of ethylene and styrene.

In a more preferred embodiment of the above-described invention, the oxygen scavenging material is incorporated into the container as a film.

In a yet more preferred embodiment of the above-described invention, the film is a strip attached to the container's interior surface.

In a still more preferred embodiment of the above-described invention, the film is a layer of the container's interior surface.

In a yet more preferred embodiment of the above-described invention, the container is manufactured from a paperboard comprising a laminated oxygen barrier layer.

In another preferred embodiment of the above-described invention, the container in the above method is a gable-top carton or a rectangular carton.

In yet another preferred embodiment of the above-described invention, the container in the above method comprises an oxygen barrier.

In a more preferred embodiment of the above-described invention, the oxygen barrier comprises an oxygen scavenging composition.

In a still more preferred embodiment of the above-described invention, the oxygen barriers in the container are selected from the group consisting of polyamides, ethylene vinyl alcohol (EVOH), polyvinylidene chloride (PVDC), polyethylene terephthalate (PET), polyethylene naphthalate (PEN), polyacrylonitrile (PAN), and oxygen barrier films.

In a yet more preferred embodiment of the above-described invention, the oxygen barrier films in the above method are selected from the group consisting of polyamide films, ethylene vinyl alcohol films, silica films, foil, metallized films, nylon/EVOH/nylon, oriented polypropylene, polyester films, oriented polyethylene, and PVDC coated substrates.

In a still more preferred embodiment of the above-described invention, the substrates of the PVDC coated substrates are selected from the group consisting of polypropylene, polyester, cellophane and paper.

In a yet more preferred embodiment of the above-described invention, the substrates of the PVDC coated substrates are monolayer films or multi-layer films.

In a still more preferred embodiment of the above-described invention, the oxygen barriers are polymers, films or papers coated with silica oxide or metal oxide.

In another preferred embodiment of the above-described invention, the container comprises sealing layers.

In yet another preferred embodiment of the above-described invention, the oxygen scavenging material further comprises a transition metal catalyst.

In still another preferred embodiment of the above-described invention, the oxygen scavenging composition is initiated by moisture or actinic radiation.

In a more preferred embodiment of the above-described invention, the transition metal catalyst is a metal salt.

In another more preferred embodiment of the above-described invention, the metal in the metal salt is cobalt.

In yet another more preferred embodiment of the above-described invention, the metal salt is selected from the group consisting of cobalt neodecanoate, cobalt 2-ethylhexanoate, cobalt oleate and cobalt stearate.

In still another more preferred embodiment of the above-described invention, the oxygen scavenging composition further comprises at least one triggering material to enhance initiation of oxygen scavenging.

In yet another more preferred embodiment of the above-described invention, the triggering material is a photoinitiator.

In another preferred embodiment of the above-described invention, the oxygen scavenging material in the above method is initiated by moisture or actinic radiation.

In another embodiment, the present invention relates to a rigid paperboard container, the container being constructed from extrusion coated or laminated paperboard comprising:

(a) a paperboard substrate having opposed inner and outer surfaces;
(b) a first polymer layer coated or laminated onto the outer surface of said paperboard substrate; and
(c) an inner, product contact, sandwich layer comprising a barrier layer and an oxygen scavenging layer.

In a preferred embodiment of the above-described embodiment of the invention, the inner, product contact sandwich layer further comprises a tie layer adjacent to the barrier layer.

In another preferred embodiment of the above-described embodiment of the invention, the inner product contact sandwich layer further comprises a seal layer coating or laminating the innermost surface of the inner, product contact sandwich layer.

In another preferred embodiment of the above-described embodiment of the invention, a second polymer layer is coated or laminated onto the inner surface of the paperboard substrate.

In another preferred embodiment of the above-described embodiment of the invention, a tie layer is juxtaposed between the barrier layer and the second polymer layer coated or laminated onto the inner surface of the paperboard substrate.

In yet another preferred embodiment of the above-described embodiment of the invention, a third polymer layer is coated or laminated onto the inner surface of the oxygen scavenging layer of the inner, product contact, sandwich layer.

In still another preferred embodiment of the above-described embodiment of the invention, the inner, product contact, sandwich layer further comprises a fourth polymer layer and a second oxygen scavenging layer, the second oxygen scavenging layer being on the inner surface of the third polymer layer and the fourth polymer layer coating or laminating the inner surface of the second oxygen scavenging layer.

In yet another preferred embodiment of the above-described embodiment of the invention, a tie layer is coated or laminated onto the inner surface of the oxygen scavenging layer and an ethylene vinyl alcohol layer is coated or laminated onto the inner surface of the tie layer coating or laminating the inner surface of the oxygen scavenging layer.

In still another preferred embodiment of the above-described embodiment of the invention, the inner, product contact, sandwich layer further comprises a second barrier layer and a second tie layer, the second barrier layer being on the inner surface of the first tie layer and the second tie layer being juxtaposed between the inner surface of the second barrier layer and the outer surface of the oxygen scavenging layer.

In a more preferred embodiment of the above-described embodiments of the invention, the oxygen scavenging material is selected from the group consisting of oxidizable polymers, ethylenically unsaturated polymers, benzylic polymers, allylic polymers, polybutadiene, poly[ethylene-methyl acrylate-cyclohexene acrylate] terpolymers, poly[ethylene-vinylcyclohexene] copolymers, polylimonene resins, poly β-pinene and poly α-pinene.

In a more preferred embodiment of the above-described embodiments of the invention, the oxygen scavenging material of either of the above methods comprises a polymeric backbone, cyclic olefinic pendent groups and linking groups linking the olefinic pendent groups to the polymeric backbone.

In a more preferred embodiment of the above-described embodiments of the invention, the polymeric backbone is ethylenic and the linking groups are selected from the group consisting of:

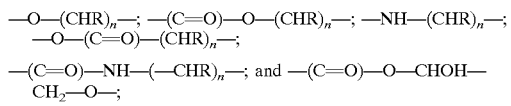

wherein R is hydrogen or an alkyl group selected from the group consisting of methyl, ethyl, propyl and butyl groups and where n is an integer in the range from 1 to 12.

In a more preferred embodiment of the above-described embodiments of the invention, the cyclic olefinic pendent groups have the structure (I):

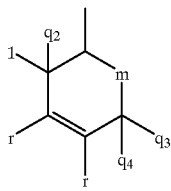

where $q_1$, $q_2$, $q_3$, $q_4$, and r are selected from the group consisting of —H, —$CH_3$, and —$C_2H_5$; and where m is —$(CH_2)_n$— with n being an integer in the range from 0 to 4; and wherein, when r is —H, at least one of $q_1$, $q_2$, $q_3$ and $q_4$ is —H.

In a more preferred embodiment of the above-described embodiments of the invention, the polymeric backbone comprises monomers selected from the group consisting of ethylene and styrene.

In a more preferred embodiment of the above-described embodiments of the invention, the polymer layer or the seal layer is selected from the group consisting of low density polyethylene polymer, linear low density polyethylene polymer, a blend of low density polyethylene polymer and linear low density polyethylene polymer, and a coextrusion of low density polyethylene polymer and linear low density polyethylene polymer.

In another more preferred embodiment of the above-described embodiments of the invention, the tie layer of the inner, product contact, sandwich layer comprises ethylene acrylic acid.

In another more preferred embodiment of the above-described embodiments of the invention, the tie layer of the inner, product contact, sandwich layer comprises ethylene methacrylic acid.

In another more preferred embodiment of the above-described embodiments of the invention, the tie layer of the inner, product contact, sandwich layer comprises maleated the layer polymers.

In another more preferred embodiment of the above-described embodiments of the invention, the tie layer of the inner, product contact, sandwich layer comprises ionomer. In a yet more preferred embodiment of the above-described embodiment, the tie layer of the inner, product contact, sandwich layer comprises zinc ionomer or sodium ionomer.

In another more preferred embodiment of the above-described embodiments of the invention, the barrier layer of the inner, product contact, sandwich layer comprises foil.

In another more preferred embodiment of the above-described embodiments of the invention, the barrier layer of the inner, product contact, sandwich layer comprises metallized film.

In another more preferred embodiment of the above-described embodiments of the invention, the barrier layer of the inner, product contact, sandwich layer comprises ethylene vinyl alcohol (EVOH).

In another more preferred embodiment of the above-described embodiments of the invention, the barrier layer of the inner, product contact, sandwich layer comprises polyamides. In a yet more preferred embodiment of the above-described embodiment, an ethylene vinyl alcohol (EVOH) layer is coated onto at least one of the inner and outer surfaces of the barrier layer.

DETAILED DESCRIPTION OF THE INVENTION

Figure 1:
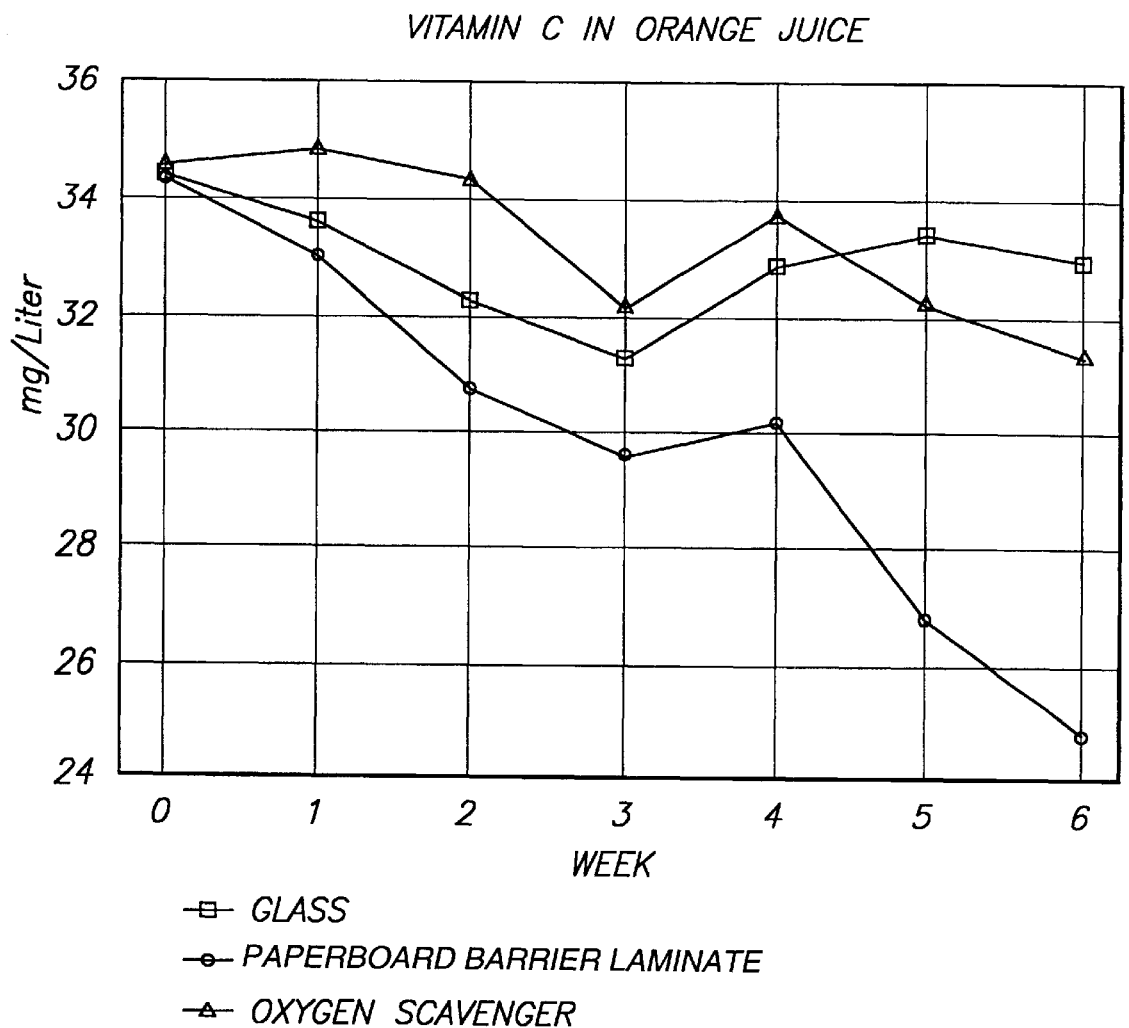
FIG. 1 is a graph showing the measured vitamin C retention in orange juice packaged in glass container, PBL and OS cartons as described in Example 1. The graph is plotted as mg/liter vitamin C vs. time.

The oxygen scavenging system of the present invention has a number of benefits including, but not limited to: extending shelf life; preserving product color; improving taste and odor; reducing mold growth; and retaining vitamin and other nutritional value.

Because these scavengers are actually part of the package, they eliminate the additional handling steps and safety concerns associated with oxygen scavenging sachets. In fact, the oxygen scavenging system of the present invention could be incorporated into an existing packaging structure without any consumer awareness of change in the package appearance.

The oxygen scavenging polymers can be incorporated into a layer of a film or rigid package using standard extrusion equipment. Because the scavenger material permeates an entire layer incorporated into the package wall, the capacity per cost of scavenger compares very favorably to systems where the scavenger is added into the package wall in some fashion.

This invention relates to the use of oxygen scavengers in packaging materials, for example, extrusion-coated, rigid containers. In a more specific embodiment, the containers are in the form of gable top and rectangular cartons, for beverages, foods, and other oxygen sensitive materials and components. A non-limiting list of possible products include fruit juices, prepared foods, snack foods, as well as other oxygen-sensitive materials such as chemicals and oxygen-sensitive components, such as computer parts.

The containers in the present invention can be filled under either aseptic packaging conditions or under cold-filled packaging conditions, without the specific procedures used for aseptic packaging conditions (which is how the samples discussed in the Examples are prepared).

A non-limiting description of a typical procedure used for aseptic packaging conditions for carton containers is as follows. The packaging materials are formed into cartons and sterilized in the filler machine with hot hydrogen peroxide vapor. Once the vapor is evaporated with hot, sterile air or ultraviolet light, the sterilized package is filled at ambient temperature with the sterilized product and then sealed within a sterile zone.

By incorporating an oxygen scavenging layer as an inner layer in the walls of the packaging material or as a strip attached somewhere on the inner surface of the packaging material, oxidation of product properties, such as the nutritional value in beverages or foods, is reduced significantly.

In a preferred embodiment, the oxygen scavengers are combined with a transition-metal salt to catalyze the oxygen scavenging properties of the materials. A transition-metal salt, as the term is used here, comprises an element chosen from the first, second and third transition series of the periodic table of the elements, particularly one that is capable of promoting oxygen scavenging. This transition-metal salt is in a form, which facilitates or imparts scavenging of oxygen by the composition of this invention. A plausible mechanism, not intended to place limitations on this invention, is that the transition element can readily inter-convert between at least two oxidation states and facilitates formation of free radicals. Suitable transition-metal elements include, but are not limited to, manganese II or III, iron II or III, cobalt II or III, nickel II or III, copper I or II, rhodium II, III or IV, and ruthenium.

The oxidation state of the transition-metal element when introduced into the composition is not necessarily that of the active form. It is only necessary to have the transition-metal element in its active form at or shortly before the time that the composition is required to scavenge oxygen. The transition-metal element is preferably iron, nickel or copper, more preferably manganese, and most preferably cobalt.

Suitable counter-ions for the transition metal element are organic or inorganic anions. These include, but are not limited to, chloride, acetate, stearate, oleate, palmitate, 2-ethylhexanoate, citrate, glycolate, benzoate, neodecanoate or naphthenate. Organic anions are preferred. Particularly preferable salts include cobalt 2-ethylhexanoate, cobalt benzoate, cobalt stearate, cobalt oleate and cobalt neodecanoate. The transition-metal element may also be introduced as an ionomer, in which case a polymeric counter-ion is employed.

The composition of the present invention when used in forming an oxygen scavenging packaging article can be composed solely of the above-described polymer and transition metal catalyst. However, components, such as photoinitiators, can be added to further facilitate and control the initiation of oxygen scavenging properties. For instance, it is often preferable to add a photoinitiator, or a blend of different photoinitiators, to the oxygen scavenger compositions, especially when antioxidants are included to prevent premature oxidation of that composition during processing.

Suitable photoinitiators are well known in the art. Such photoinitiators are discussed in U.S. patent application Ser. No. 08/857,325 in which some of the present inventors were contributing inventors and which is incorporated herein by reference. Specific examples include, but are not limited to, benzophenone, o-methoxy-benzophenone, acetophenone, o-methoxy-acetophenone, acetophenone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, substituted and unsubstituted anthraquinones, α-tetralone, 9-acetylphenanthrene, 2-acetylphenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxy-acetophenone, α,α-dibutoxyacetophenone, etc. Singlet oxygen generating photosensitizers such as Rose Bengal, methylene blue, and tetraphenyl phosphine may also be employed as photoinitiators. Polymeric initiators include polyethylene carbon monoxide and oligo[2-hydroxy-2-methyl-1-[4-(1-methylvinyl)phenyl]propanone]. Use of a photoinitiator is preferable because it generally provides faster and more efficient initiation. When actinic radiation is used, the initiators may also provide initiation at longer wavelengths which are less costly to generate and less harmful.

When a photoinitiator is used, its primary function is to enhance and facilitate the initiation of oxygen scavenging upon exposure to radiation. The amount of photoinitiator can vary. In many instances, the amount will depend on the amount and type of monomers present in the present invention, the wavelength and intensity of radiation used, the nature and amount of antioxidants used, as well as the type of photoinitiator used. The amount of photoinitiator also depends on how the scavenging composition is used. For instance, if the photoinitiator-coating composition is placed underneath a layer, which is somewhat opaque to the radiation used, more initiator may be needed. For most purposes, however, the amount of photoinitiator, when used, will be in the range of 0.01 to 10% by weight of the total composition. The initiating of oxygen scavenging can be accomplished by exposing the packaging article to actinic or electron beam radiation, as described below.

Antioxidants may be incorporated into the scavenging compositions used in this invention to control degradation of the components during compounding and shaping. An antioxidant, as defined herein, is any material, which inhibits oxidative degradation or cross-linking of polymers. Typically, such antioxidants are added to facilitate the processing of polymeric materials and/or prolong their useful lifetime.

Antioxidants such as Vitamin E, Irganox® 1010, 2,6-di (t-butyl)-4-methyl-phenol(BHT), 2,2'-methylene-bis(6-t-butyl-p-cresol), triphenylphosphite, tris-(nonylphenyl) phosphite and dilaurylthiodipropionate would be suitable for use with this invention.

When an antioxidant is included as part of the packaging, it should be used in amounts which will prevent oxidation of the scavenger composition's components as well as other materials present in a resultant blend during formation and processing but the amount should be less than that which would interfere with the scavenging activity of the resultant layer, film or article after initiation has occurred. The particular amount needed will depend on the particular components of the composition, the particular antioxidant used, the degree and amount of thermal processing used to form the shaped article, and the dosage and wavelength of radiation applied to initiate oxygen scavenging and can be determined by conventional means. Typically, they are present in about 0.01 to 1% by weight.

Other additives which may also be included in oxygen scavenger layers include, but are not necessarily limited to, fillers, pigments, dyestuffs, stabilizers, processing aids, plasticizers, fire retardants, anti-fog agents, etc.

The amounts of the components which are used in the oxygen scavenging compositions, or layers have an effect on the use, effectiveness and results of this method. Thus, the amounts of polymer, transition metal catalyst and any photoinitiator, antioxidant, polymeric diluents and additives, can vary depending on the article and its end use.

For instance, one of the primary functions of the polymer described above is to react irreversibly with oxygen during the scavenging process, while the primary function of the transition metal catalyst is to facilitate this process. Thus, to a large extent, the amount of polymer present will affect the oxygen scavenging capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

Any further additives employed normally will not comprise more than 10% of the scavenging composition, with preferable amounts being less than 5% by weight of the scavenging composition.

Optionally, the methods of this invention can include exposure of the polymer containing the oxygen scavenging-promoting transition metal catalyst to actinic radiation to reduce the induction period, if any, before oxygen scavenging commences. A method is known for initiating oxygen scavenging by exposing a film comprising an oxidizable organic compound and a transition metal catalyst to actinic radiation. Such methods are discussed in U.S. Pat. No. 5,211,875, the disclosure of which patent is incorporated herein by reference. A composition of the present invention which has a long induction period in the absence of actinic radiation but a short or non-existent induction period after exposure to actinic radiation is particularly preferred. Compositions which are activated by actinic radiation can be stored without special preparation or storage requirements, such as being packaged or kept in a nitrogen environment. They maintain a high capability for scavenging oxygen upon activation with actinic radiation. Thus, oxygen scavenging can be activated when desired.

The radiation used in this method could be light, e.g., ultraviolet or visible light having a wavelength of about 200 to 750 nanometers (nm), and preferably having a wavelength of about 200 to 600 nm, and most preferably from about 200 to 400 nm. When employing this method, it is preferable to expose the oxygen scavenger to at least 1 Joule per gram of scavenging composition. A typical amount of exposure is in the range of 10 to 2000 Joules per gram. The radiation can also be an electron beam radiation at a dosage of about 2 to 200 kiloGray, preferably about 10 to 100 kiloGray. Other sources of radiation include ionizing radiation such as gamma, X-rays and corona discharge. The duration of exposure depends on several factors including, but not limited to, the amount and type of photoinitiator present, thickness of the layers to be exposed, thickness and opacity of intervening layers, amount of any antioxidant present, and the wavelength and intensity of the radiation source. The radiation provided by heating of polyolefin and the like polymers (e.g., 100–250° C.) during processing does not enable triggering to take effect.

In various specific embodiments, the use of oxygen-scavenging compositions in the present invention can be accomplished by coating oxygen scavenging composition onto materials such as metallic foil, polymer film, metallized film, paper or cardboard to provide oxygen scavenging properties. The compositions are also useful in making articles such as single or multi-layer rigid thick-walled plastic containers or bottles (typically, between 8 and 100 mils in thickness) or in making single or multi-layer flexible films, especially thin films (less than 3 mil, or even as thin as about 0.25 mil). Some of the compositions of the present invention are easily formed into films using well-known means. These films can be used alone or in combination with other films or materials.

The compositions used in the present invention may be further combined with one or more polymers, such as thermoplastic polymers which are typically used to form film layers in plastic packaging articles. In the manufacture of certain packaging articles, well-known thermosets can also be used as a polymeric diluent.

Selecting combinations of a diluent and the composition used in the present invention depends on the properties desired. Polymers which can be used as the diluent include, but are not limited to, polyethylene, low or very low density polyethylene, polypropylene, polyvinyl chloride, and ethylene copolymers such as ethylene-vinyl acetate, ethylene-alkyl acrylates or methacrylates, ethylene-acrylic acid or methacrylic acid, and ethylene-arylic or methacrylic acid ionomers. In rigid packaging applications, polystyrene is used; and in rigid articles such as beverage containers, polyethylene terephthalate (PET) is often used. Blends of different diluents may also be used. However, as indicated above, the selection of the polymeric diluent largely depends on the article to be manufactured and the end use. Such selection factors are well known in the art.

If a diluent polymer such as a thermoplastic is employed, it should further be selected according to its compatibility with the composition of the present invention. In some instances, the clarity, cleanliness, effectiveness as an oxygen-scavenger, barrier properties, mechanical properties and/or texture of the article can be adversely affected by a blend containing a polymer which is incompatible with the composition of the present invention.

A blend of a composition used in the present invention with a compatible polymer can be made by dry blending or by melt-blending the polymers together at a temperature in the approximate range of 50° C. to 250° C. Alternative methods of blending include the use of a solvent followed by evaporation. When making film layers or articles from oxygen-scavenging compositions, extrusion or coextrusion, solvent casting, injection molding, stretch blow molding, orientation, thermoforming, extrusion coating, coating and curing, lamination or combinations thereof would typically follow the blending.

Layers in the package wall of the present invention may be in several forms. They may be in the form of stock films, including "oriented" or "heat shrinkable" films, which may ultimately be processed as bags, etc., or in the form of stretch-wrap films. The layers may also be in the form of sheet inserts to be placed in a packaging cavity. In a preferred embodiment of a rigid paperboard beverage container, the layer may be within the container's walls. Even further, the layer may also be in the form of a liner placed with or in the container's lid or cap. The layer may even be coated or laminated onto any one of the articles mentioned above.

In multi-layered articles, the scavenging layer used in the present invention may be included with layers such as, but not necessarily limited to, "oxygen barriers", i.e., layers of material having an oxygen transmission rate equal to or less than 100 cubic centimeters per square meter ($cc/m^2$) per day per atmosphere pressure at room temperature, i.e., about 25° C. Typical oxygen barriers comprise poly(ethylene vinyl alcohol), polyacrylonitrile, polyvinyl chloride, poly (vinylidene dichloride), polyethylene terephthalate, silica coated materials and polyamides. Metal foil layers can also be employed.

To determine the oxygen scavenging capabilities of a composition, the rate of oxygen scavenging can be calculated by measuring the time that elapsed before the article depletes a certain amount of oxygen from a sealed container. For instance, a film comprising the scavenging component can be placed in an air-tight, sealed container of a certain oxygen containing atmosphere, e.g., air which typically contains 20.9% oxygen by volume. Then, over a period of time, samples of the atmosphere inside the container are removed to determine the percentage of oxygen remaining. The scavenging rates of the compositions and layers used in the present invention will change with changing temperature and atmospheric conditions.

When an active oxygen barrier is prepared, the scavenging rate can be as low as 0.1 cc oxygen per gram of composition of the present invention per day in air at 25° C. and 1 atmosphere pressure. However, preferable compositions of this invention have rates equal to or greater than 1 cc oxygen per gram per day, thus making them suitable for scavenging oxygen from within a package, as well as suitable for active oxygen barrier applications. Many compositions are even capable of more preferable rates equal to or greater than 5.0 cc $O_2$ per gram per day.

Generally, film layers suitable for use as an active oxygen barrier can have an oxygen transmission rate as high as 10 cc oxygen per square meter per mil per day when measured in air at 25° C. and 1 atmosphere pressure. Preferably, a layer of this invention has an oxygen transmission rate less than about 1 cc oxygen per square meter per mil per day, and more preferably has an oxygen transmission rate less than about 0.2 cc oxygen per square meter per mil per day under the same conditions, thus making it suitable for active oxygen barrier applications as well as for scavenging oxygen from within a package.

In an active oxygen barrier application, it is preferable that the combination of oxygen barriers and any oxygen scavenging activity create an overall oxygen transmission rate of less than about 1.0 cubic centimeter-mil per square meter per day per atmosphere pressure at 25° C. Another definition of acceptable oxygen scavenging is derived from testing actual packages. In actual use, the scavenging rate requirement will largely depend on the internal atmosphere of the package, the contents of the package and the temperature at which it is stored.

In a packaging article made according to this invention, the scavenging rate will depend primarily on the amount and nature of the composition of the present invention in the article, and secondarily on the amount and nature of other additives (e.g., diluent polymer, antioxidant, etc.) which are present in the scavenging component, as well as the overall manner in which the package is fabricated, e.g., surface area/volume ratio.

The oxygen scavenging capacity of an article comprising the invention can be measured by determining the amount of oxygen consumed until the article becomes ineffective as a scavenger. The scavenging capacity of the package will depend primarily on the amount and nature of the scavenging moieties present in the article, as discussed above.

In actual use, the oxygen scavenging capacity requirement of the article will largely depend on three parameters of each application:
(1) the quantity of oxygen initially present in the package;
(2) the rate of oxygen entry into the package in the absence of the scavenging property; and
(3) the intended shelf life for the package.

The scavenging capacity of the composition can be as low as 1 cc oxygen per gram, but is preferably at least 10 cc oxygen per gram, and more preferably at least 50 cc oxygen per gram. When such compositions are in a layer, the layer will preferably have an oxygen capacity of at least 250 cc oxygen per square meter per mil thickness and more preferably at least 500 cc oxygen per square meter per mil thickness.

Other factors may also affect oxygen scavenging and should be considered when selecting compositions. These factors include but are not limited to temperature, relative humidity, and the atmospheric environment in the package.

EXAMPLES

Experiments were performed with several kinds of orange juice containers to measure both the amount of oxygen in the headspace of the containers as well as the amount of oxygen dissolved in the juice and the amount of ascorbic acid contained in the juice over a period of six weeks.

Example 1

A six-week shelf life study was conducted with orange juice packaged in commercial paperboard barrier laminate (PBL) cartons and in experimental carton samples using laminated board stock containing oxygen scavenging polymer in the inner layers of the cartons. PBL cartons consist of a laminated paperboard with a low density polyethylene coated on the outer surface of the paperboard and an oxygen barrier layer on the inside surface of the paperboard. The experimental oxygen scavenging (OS) cartons consisted of the PBL carton with a three-layer oxygen scavenging film (ABA Structure: Polyethylene/oxygen scavenging polymer/Polyethylene) further laminated on the inside surface of the oxygen barrier layer. PBL cartons containing loose strips of the three-layer oxygen scavenging film were also used. The oxygen scavenging films were one of three sizes: 4"×3½", 4"×7", and 4"×14".

The juice cartons were stored at 40° F. and the orange juice was tested for ascorbic acid (vitamin C) and dissolved oxygen on a weekly basis. After six weeks, the orange juice packaged in the oxygen scavenger cartons retained a significantly greater amount of vitamin C as compared to the commercial PBL cartons.

Cartons were filled with orange juice and the amount of dissolved oxygen in the orange juice was measured using a YSI Dissolved Oxygen meter. The amount of vitamin C was measured by a visual titration method used extensively by the citrus industry, (AOAC Method, 1965, Official methods of Analysis, p. 764).

Orange juice in glass bottles was used as the control. PBL cartons were used as a standard. The oxygen scavenger laminate portion of the PBL carton with oxygen scavenger laminate was extrusion coated and later converted into trial cartons.

The six packaging constructions filled with orange juice were:
(1) Glass—Control.
(2) PBL carton—Standard.
(3) PBL carton with oxygen scavenger laminate (OS).
(4) PBL carton with 4"×3½" oxygen scavenger film strip (Film 3).
(5) PBL carton with 4"×7" oxygen scavenger film strip (Film 4).
(6) PBL carton with 4"×14" oxygen scavenger film strip (Film 5).

The oxygen scavenging cartons and films were exposed to ultra-violet light to activate the oxygen scavenger. The rapid decrease of dissolved oxygen in these cartons is noted in the data. The oxygen scavenger at day one, (week 0), had already begun to remove oxygen from the juice. By week one, the dissolved oxygen had dropped significantly and remained low throughout the study. This correlated with the retention of vitamin C in these cartons.

Agitation of the juice during filling increases the oxygen present in solution. The oxygen scavenger filmstrips, which were dropped into PBL cartons, were aggressive in removing oxygen from the orange juice but were not as effective as the extruded OS cartons. Th is may be due to the limited exposure and surface area of the strips in relation to the volume of the orange juice.

Figure 2:
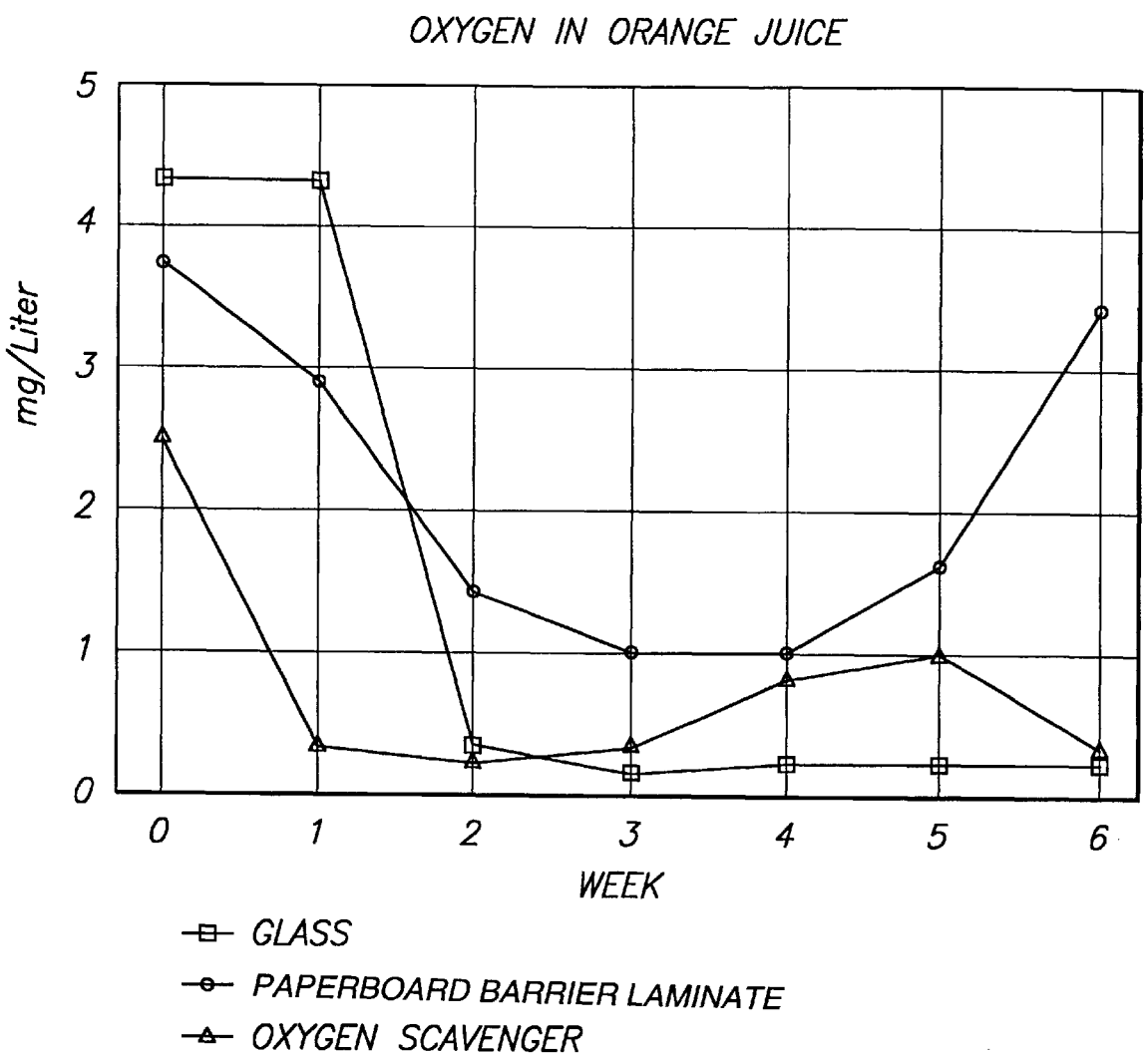
FIG. 2 is a graph showing the measured dissolved oxygen in orange juice packaged in glass container, PBL and OS cartons as described in Example 1. The graph is plotted as mg/liter oxygen vs. time.
Figure 3:
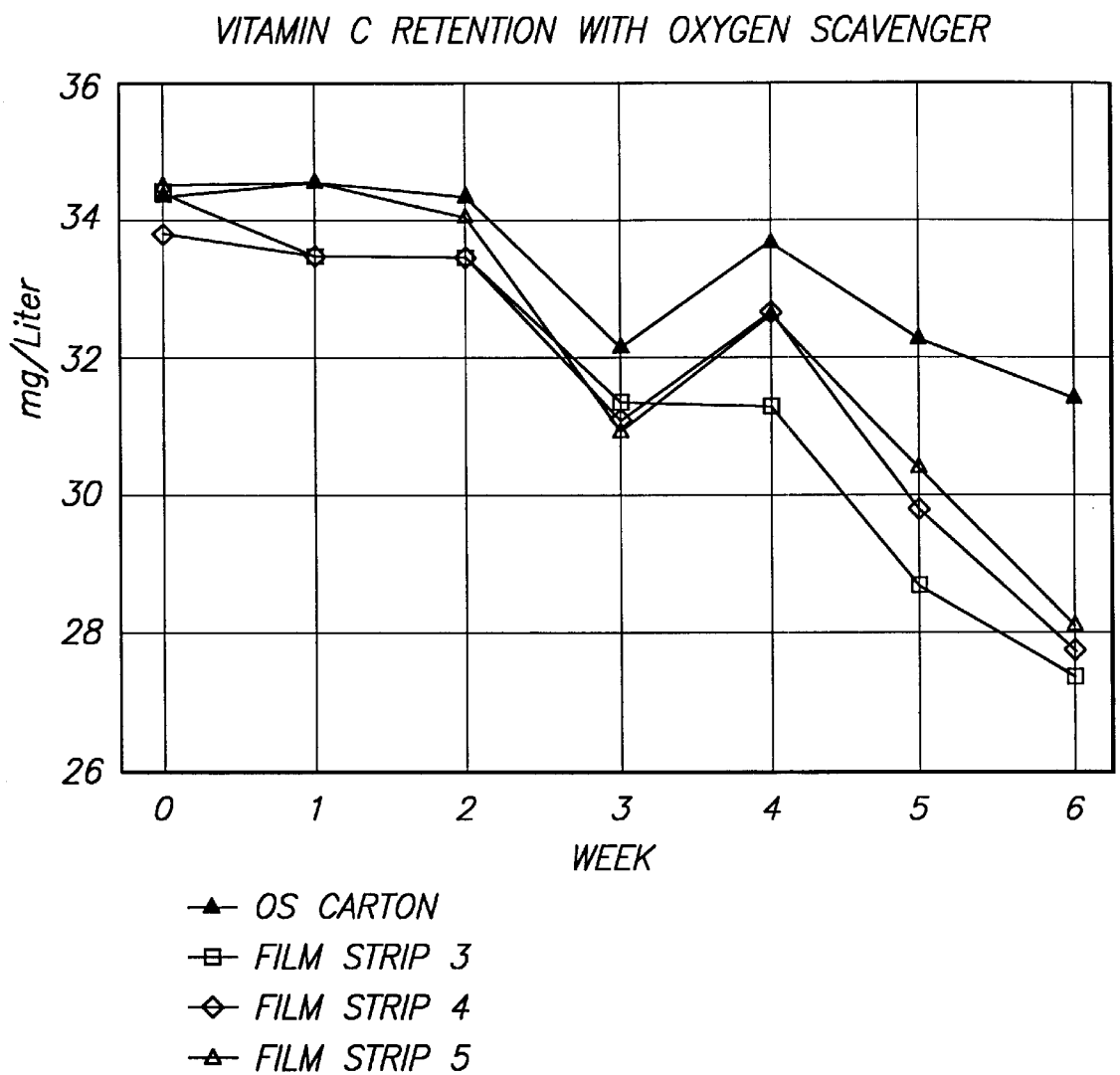
FIG. 3 is a graph showing the measured vitamin C retention in orange juice packaged in OS and PBL cartons with OS films as described in Example 1. The graph is plotted as mg/liter vitamin C vs. time.
Figure 4:
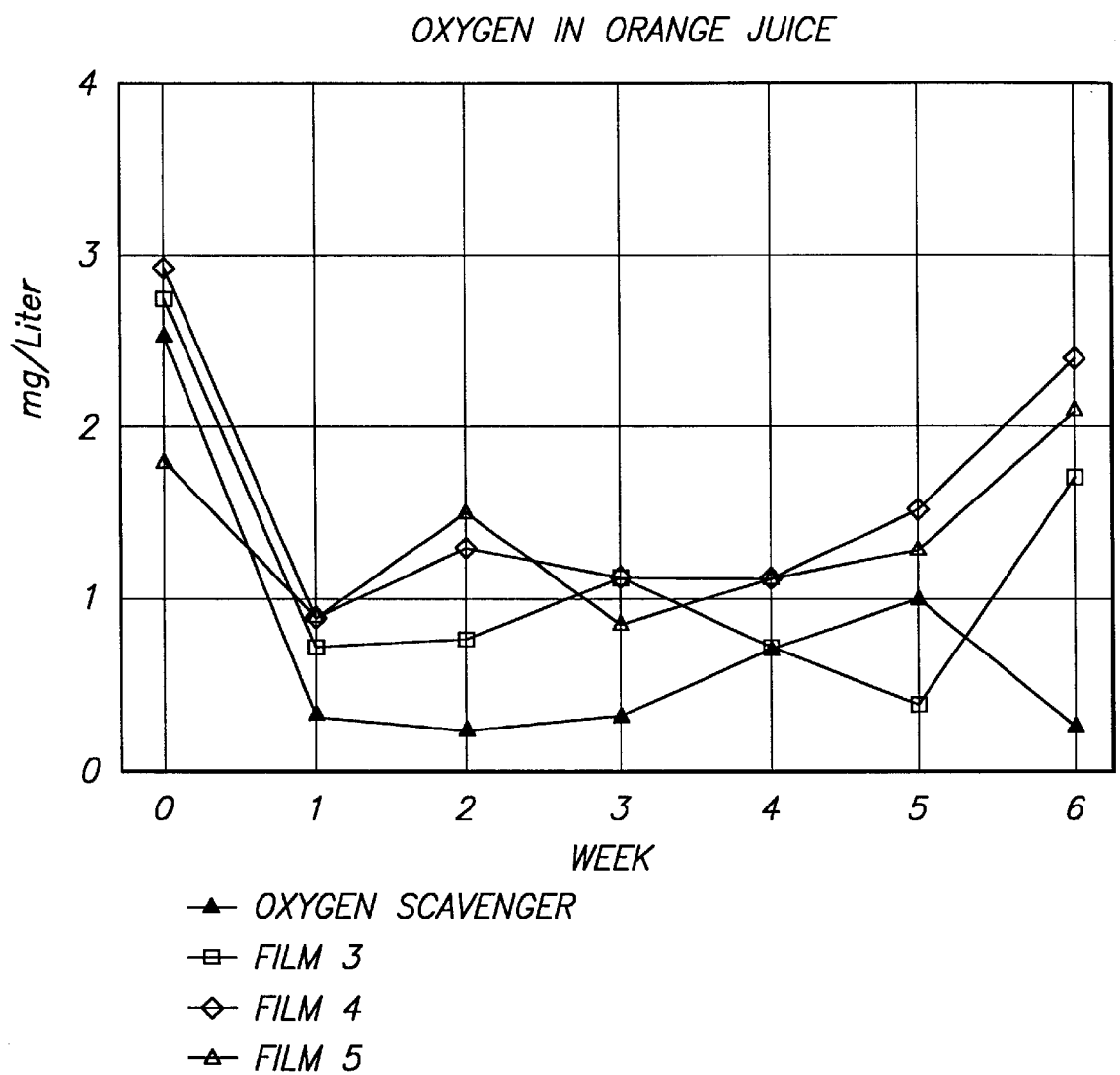
FIG. 4 is a graph showing the measured dissolved oxygen in OS and PBL cartons with OS films as described in Example 1. The graph is plotted as mg/liter oxygen vs. time.

Graphs have been separated into four groups for ease of interpretation:
FIG. 1) Vitamin C retention in glass container, PBL and OS cartons.
FIG. 2) Amount of dissolved oxygen in glass, PBL and OS cartons.
FIG. 3) Vitamin C retention in OS carton and PBL cartons with OS film strips.
FIG. 4) Dissolved oxygen in OS carton and PBL cartons with OS film strips.

| VITAMIN C DATA, MG/LITER | | | | | | |
|---|---|---|---|---|---|---|
| WEEK | GLASS | PBL | OS | FILM 3 | FILM 4 | FILM 5 |
| 0 | 34.34 | 34.27 | 34.54 | 34.54 | 33.85 | 34.73 |
| 1 | 33.67 | 33.06 | 34.86 | 33.37 | 33.42 | 34.86 |
| 2 | 32.37 | 30.75 | 34.33 | 33.35 | 33.35 | 34.08 |
| 3 | 31.24 | 29.58 | 32.21 | 31.34 | 31.04 | 30.95 |
| 4 | 32.86 | 30.15 | 33.72 | 31.25 | 32.76 | 32.76 |
| 5 | 33.42 | 26.77 | 32.32 | 28.68 | 29.8 | 30.42 |
| 6 | 32.96 | 24.76 | 31.36 | 27.28 | 27.67 | 28.16 |

| TOTAL VITAMIN C LOSS AFTER SIX WEEKS | | | | | | |
|---|---|---|---|---|---|---|
| | GLASS | PBL | OS | FILM 3 | FILM 4 | FILM 5 |
| % | 3.8 | 27.2 | 9.1 | 20.9 | 18.3 | 18.7 |

| DISSOLVED OXYGEN, MG/LITER | | | | | | |
|---|---|---|---|---|---|---|
| WEEK | GLASS | PBL | OS | FILM 3 | FILM 4 | FILM 5 |
| 0.0 | 4.3 | 3.8 | 2.5 | 2.7 | 2.9 | 1.8 |
| 1.0 | 4.3 | 2.9 | 0.3 | 0.7 | 0.9 | 0.9 |
| 2.0 | 0.3 | 1.4 | 0.2 | 0.8 | 1.3 | 1.5 |
| 3.0 | 0.1 | 1.0 | 0.3 | 1.1 | 1.1 | 0.9 |
| 4.0 | 0.2 | 1.0 | 0.8 | 0.8 | 1.1 | 1.1 |
| 5.0 | 0.2 | 1.6 | 1.0 | 0.4 | 1.5 | 1.3 |
| 6.0 | 0.2 | 3.4 | 0.3 | 1.7 | 2.3 | 4.0 |

Nutritional labeling of the orange juice requires that the stated percent of vitamin C be maintained through the out date posted on the carton. Oxygen will cause vitamin C to oxidize resulting in a loss of vitamin C. The purpose of the oxygen scavenger is to remove oxygen from the juice, from the package headspace, and any fugitive oxygen that permeates through the package wall. This action is accomplished by a catalyzed metal reaction of the scavenger polymer with oxygen. The oxygen scavenging polymer used in this test was a styrene/butadiene/styrene-based oxygen scavenger containing 1000 ppm of cobalt ion (as cobalt neodecanoate) and 1000 ppm of benzoylbiphenyl (BBP) photoinitiator.

Barrier films, such as polyamides used in PBL, slow the permeation rate of oxygen through the board structure, but do not remove the oxygen from the package headspace or contents. The oxygen scavenger works to remove residual and/or fugitive oxygen present in the package contents.

These preliminary results indicate that this oxygen scavenging package provides superior results for the extension of orange juice shelf life.

Example 2

Organoleptic Tests

The organoleptics (negative effects on taste and odor) of the present invention were tested by comparing the taste of water and a fatty food packaged in an extrusion coated package having a layer of oxygen scavenging material incorporated as an internal layer of the package material with water and a fatty food packaged in a control package of identical structure but without the oxygen scavenging layer. Triangle tests with forced preferences were run using 28 trained panelists. In all cases, the sensory panel results showed a statistically significant ($P<0.0001$) preference for the packages containing the oxygen scavenging system over the control.

Although a few embodiments of the invention have been described in detail above, it will be appreciated by those skilled in the art that various modifications and alterations can be made to the particular embodiments shown without materially departing from the novel teachings and advantages of the invention. Accordingly, it is to be understood that all such modifications and alterations are included within the spirit and scope of the invention as defined by the following claims.

What is claimed is:

1. A rigid paperboard container, the container being constructed from extrusion coated or laminated paperboard comprising:
   (a) a paperboard substrate having opposed inner and outer surfaces;
   (b) a first polymer layer coated or laminated onto the outer surface of said paperboard substrate; and
   (c) an inner, product contact sandwich layer comprising an oxygen barrier layer and an oxygen scavenging layer, wherein the oxygen scavenging layer comprises an oxygen scavenging polymer comprising a polymeric backbone, cyclic olefinic pendant groups, and linking groups linking the olefinic pendant groups to the polymeric backbone.

2. A rigid paperboard container according to claim 1 wherein the polymeric backbone is ethylenic and the linking groups are selected from the group consisting of:

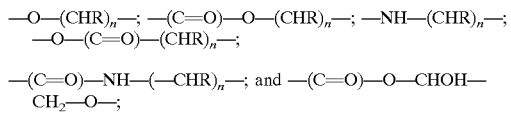

—(C=O)—NH—(—CHR)$_n$—; and —(C=O)—O—CHOH—CH$_2$—O—;

wherein R is hydrogen or an alkyl group selected from the group consisting of methyl, ethyl, propyl and butyl groups and where n is an integer in the range from 1 to 12.

3. A rigid paperboard container according to claim 1 wherein the cyclic olefinic pendent groups have the structure (I):

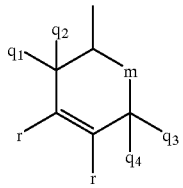

where $q_1$, $q_2$, $q_3$, $q_4$, and r are selected from the group consisting of —H, —CH$_3$, and —C$_2$H$_5$; and where m is —(CH$_2$)$_n$— with n being an integer in the range from 0 to 4; and wherein, when r is —H, at least one of $q_1$, $q_2$, $q_3$ and $q_4$ is —H.

4. A rigid paperboard container according to claim 1 wherein the polymeric backbone comprises monomers selected from the group consisting of ethylene and styrene.

5. A rigid paperboard container according to claim 1 wherein the inner, product contact sandwich layer further comprises a tie layer adjacent to the barrier layer.

6. A rigid paperboard container according to claim 1 wherein the inner product contact sandwich layer further comprises a seal layer coating or laminating the innermost surface of the inner, product contact sandwich layer.

7. A rigid paperboard container according to claim 1 wherein a second polymer layer is coated or laminated onto the inner surface of said paperboard substrate.

8. A rigid paperboard container according to claim 1 wherein a third polymer layer is coated or laminated onto the inner surface of the oxygen scavenging layer of the inner, product contact, sandwich layer.

9. A rigid paperboard container according to claim 6, wherein the polymer layer or the seal layer is selected from the group consisting of low density polyethylene polymer, linear low density polyethylene polymer, a blend of low density polyethylene polymer and linear low density polyethylene polymer, and a coextrusion of low density polyethylene polymer and linear low density polyethylene polymer.

10. A rigid paperboard container according to claim 7 wherein a tie layer is juxtaposed between the barrier layer and the second polymer layer coated or laminated onto the inner surface of the paperboard substrate.

11. A rigid paperboard container according to claim 8 wherein the inner, product contact, sandwich layer further comprises a fourth polymer layer and a second oxygen scavenging layer, the second oxygen scavenging layer being on the inner surface of the third polymer layer and the fourth polymer layer coating or laminating the inner surface of the second oxygen scavenging layer.

12. A rigid paperboard container according to claim 8 wherein a tie layer is coated or laminated onto the inner surface of the oxygen scavenging layer and an ethylene vinyl alcohol layer is coated or laminated onto the inner surface of the tie layer coating or laminating the inner surface of the oxygen scavenging layer.

13. A rigid paperboard container according to claim 8 wherein the inner, product contact, sandwich layer further comprises a second barrier layer and a second tie layer, the second barrier layer being on the inner surface of the first tie layer and the second tie layer being juxtaposed between the inner surface of the second barrier layer and the outer surface of the oxygen scavenging layer.

14. A rigid paperboard container according to claims 1, 5, 6, 7, 10, 8, 11, 12 or 13 wherein the oxygen scavenging material is selected from the group consisting of oxidizable polymers, ethylenically unsaturated polymers, benzylic polymers, allylic polymers, polybutadiene, poly[ethylene-methyl acrylate-cyclohexene acrylate] terpolymers, poly [ethylene-vinylcyclohexene] copolymers, polylimonene resins, poly β-pinene and poly α-pinene.

15. A rigid paperboard container according to claim 1, 5, 7, 10, 8, 11, 12 or 13 wherein the polymer layer is selected from the group consisting of low density polyethylene polymer, linear low density polyethylene polymer, a blend of low density polyethylene polymer and linear low density polyethylene polymer, and a coextrusion of low density polyethylene polymer and linear low density polyethylene polymer.

16. A rigid paperboard container according to claim 1, 5, 6, 7, 10, 8, 11, 12 or 13 wherein the tie layer of the inner, product contact, sandwich layer comprises ethylene acrylic acid.

17. A rigid paperboard container according to claim 1, 5, 6, 7, 10, 8, 11, 12 or 13 wherein the tie layer of the inner, product contact, sandwich layer comprises ethylene methacrylic acid.

18. A rigid paperboard container according to claim 1, 5, 6, 7, 10, 8, 11, 12 or 13 wherein the tie layer of the inner, product contact, sandwich layer comprises maleated tie layer polymers.

19. A rigid paperboard container according to claim 1, 5, 6, 7, 10, 8, 11, 12 or 13 wherein the barrier layer of the inner, product contact, sandwich layer comprises foil.

20. A rigid paperboard container according to claim 1, 5, 6, 7, 10, 8, 11, 12 or 13 wherein the barrier layer of the inner, product contact, sandwich layer comprises metallized film.

21. A rigid paperboard container according to claim 1, 5, 6, 7, 10, 8, 11, 12 or 13 wherein the barrier layer of the inner, product contact, sandwich layer comprises ethylene vinyl alcohol (EVOH).

22. A rigid paperboard container according to claim 1, 5, 6, 7, 10, 8, 11, 12 or 13 wherein the barrier layer of the inner, product contact, sandwich layer comprises polyamides.

23. A rigid paperboard container according to claim 22 wherein an ethylene vinyl alcohol (EVOH) layer is coated onto at least one of the inner and outer surfaces of the polyamides barrier layer.

24. A rigid paperboard container according to claim 1, 5, 6, 7, 10, 8, 11, 12 or 13 wherein an ethylene vinyl alcohol (EVOH) layer is coated onto at least one of the inner and outer surfaces of the barrier layer.

25. A rigid paperboard container according to claim 1, 5, 6, 7, 10, 8, 11, 12 or 13 wherein the tie layer of the inner, product contact, sandwich layer comprises ionomer.

26. A rigid paperboard container according to claim 25 wherein the tie layer of the inner, product contact, sandwich layer comprises zinc ionomer.

27. A rigid paperboard container according to claim 25 wherein the tie layer of the inner, product contact, sandwich layer comprises sodium ionomer.

* * * * *